April 15, 1969  W. MEISTER  3,438,969
PROCESS FOR THE CONTINUOUS XANTHATING OF ALKALI CELLULOSE
Filed Aug. 1, 1966
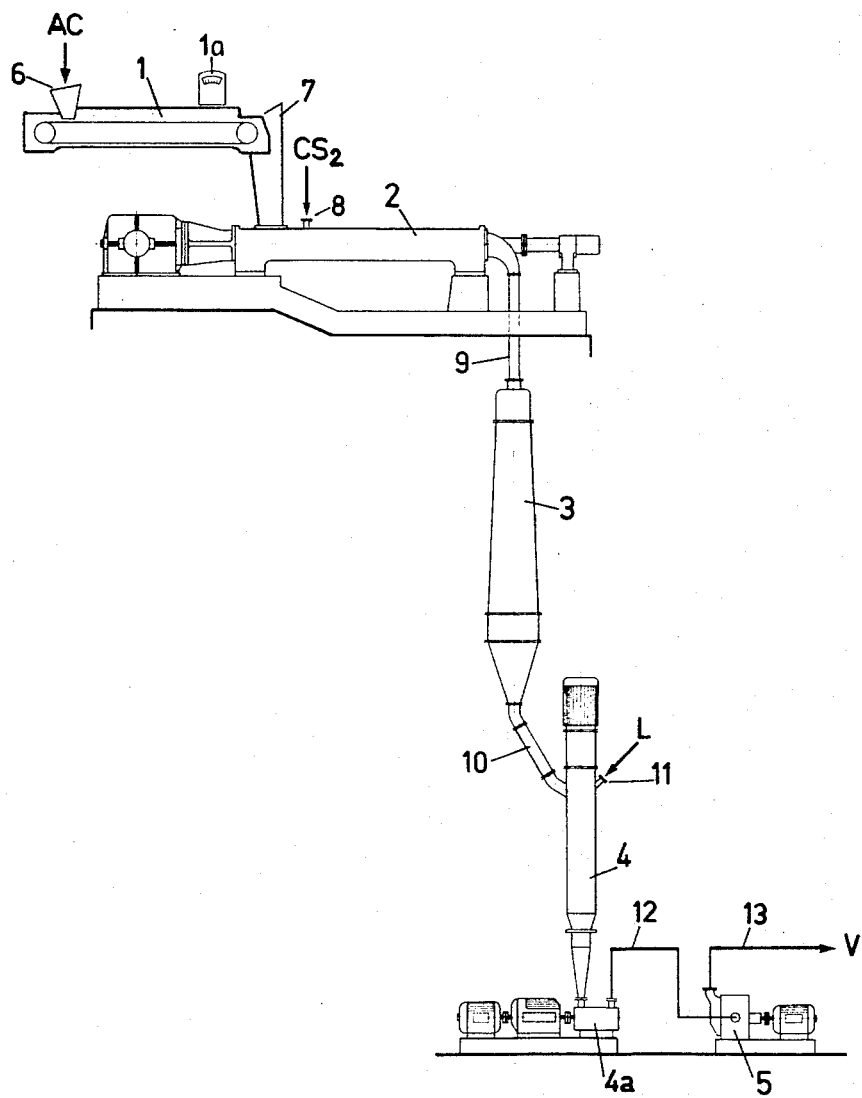
INVENTOR
WERNER MEISTER
BY Jacobi and Davidson
ATTORNEY United States Patent Office 3,438,969
Patented Apr. 15, 1969

3,438,969
PROCESS FOR THE CONTINUOUS XANTHATING OF ALKALI CELLULOSE
Werner Meister, Bern, Switzerland, assignor of one-half each to Ing. A. Maurer S.A., Bern, Switzerland, and Buss A.G., Basel, Switzerland, both corporations of Switzerland
Filed Aug. 1, 1966, Ser. No. 569,517
Claims priority, application Switzerland, Aug. 5, 1965, 10,993/65
Int. Cl. C08b 9/04
U.S. Cl. 260—216                    7 Claims

ABSTRACT OF THE DISCLOSURE

Continuous process of xanthating alkali cellulose wherein carbon disulphide is intensively kneaded into porous alkali cellulose in a worm kneader whereby the reaction mixture is continuously moved from an input position to an output position during kneading. The carbon disulphide is used in excess of the amount theoretically required for xanthating the alkali cellulose and the reaction begins at a temperature of at least about 20° C. and ends with a temperature in the range from about 30° C. up to the boiling point of the carbon disulphide. The kneading step can be extended over a time interval insufficient for the complete xanthating of the alkali cellulose and the xanthation may be completed thereafter without further kneading the reaction mixture.

---

The present invention has reference to an improved process for xanthating or xanthatizing alkali cellulose.

Generally fibers are produced from regenerated cellulose according to the so-called viscose process. Production of the spinning solution, called viscose, can be broken up into the following stages:

(1) Alkali cellulose is formed by treating cellulose or linters with caustic soda.

(2) Cellulose xanthate is formed due to the action of carbon disulphide upon the alkali cellulose.

(3) The cellulose xanthate is dissolved to viscose in caustic soda or water.

Originally, all of the processes necessary for the production of viscose were discontinuous. Thus, portions of the raw material or the intermediate products were charged into a reaction vessel. There the reaction was carried out completely and the vessel emptied. Accordingly, in the same apparatus, a given number of charges were processed, wherein the cycles consisted of filling, reacting and emptying.

Now, for the production of alkali cellulose, the immersion press was developed in which a predetermined amount of cellulose sheets are steeped in an excess of caustic soda. After formation of the alkali cellulose, the excess lye is pressed out. During xanthatizing or the production of the xanthate, a given quantity of alkali cellulose is treated with carbon disulphide in a closed vessel until forming a water soluble product. The cellulose xanthate is dissolved in an agitator or stirrer by lye or water, whereby typically one xanthating charge corresponds to one solution charge.

The enormous increase in the last decades in the production of cellulose from viscose was not merely attained by erecting new installations, rather the size of the production units also increased. Since the upper size of the apparatus is limited to a certain degree, the number of individual apparatuses for each phase or stage correspondingly increased.

Therefore, it is not surprising that there was a growing tendency to make the chemical processes continuous, also in the viscose fiber industry. However, an important factor in the development of continuously working apparatuses is time. As long as the reaction times are short, it is easy to build continuously operating apparatuses. On the other hand, if the residence or detention times in the apparatus are so long that it must be excessively large and difficult to service, then it becomes difficult or impossible to perfect a continuous operation. The same holds true if the introduction of the reaction mass into the apparatus must be so exact that each particle can only be subjected for a certain time to the reaction. This is hardly attainable with longer treatment time.

It was for the above-explained reasons that it was easier to solve the problem of producing alkali cellulose in a continuous process than the corresponding problem for the subsequent stage. Accordingly, there is already known to the art a whole series of continuously working alkalizing installations. The reaction times and the quantity of reaction agent do not play such an important role during alkalization. The chemical procedure is simple, formation of the alkali cellulose always occurs if sufficient lye or caustic soda completely uniformally permeates the cellulose. The problems to be solved were of a mechanical nature, especially that of pressing out the excess caustic soda.

In contradistinction thereto, the subsequent stage in the production of viscose, the formation of the xanthate or xanthatizing, results in greater difficulties when changing over to a continuous operation. In this respect, a series of factors must be taken into consideration, namely, (1) The shredded alkali cellulose has a weight of 150 to 250 grams per liter, in other words, it is very voluminous. Therefore, the reaction apparatuses have large dimensions.

(2) The alkali cellulose intermingled with a considerable quantity of excess air must be so intimately mixed with carbon disulphide that there is attained a uniform reaction with the alkali cellulose. In this respect, the alkali cellulose particles imbued with an excess of liquid carbon disulphide must transfer such to other particles where no carbon disulphide has reached.

(3) The treatment time must be the same for all particles. There must be insured for a uniform transportation of the reaction mixture through the apparatus. It should not happen that particles are retained and subjected for a longer time to the action of the carbon disulphide. However, the apparatus must also be designed such that the alkali cellulose does not pass in accelerated fashion through the installation.

(4) It must be possible to exactly maintain the temperature for each particle. There should be no location in the apparatus having temperature deviations, because the reaction time is largely dependent upon temperature.

(5) The proportion of carbon disulphide to air in the apparatus must be selected such that the mixture is outside the explosion region.

Accordingly, it is a primary object of the present invention to provide an improved process for the continuous xanthating of alkali cellulose which essentially complies with the foregoing requirements.

Now, a gamut of apparatuses have already been proposed for the continuous xanthatizing or treating with carbon disulphide, which however, have not proven themselves in actual practice.

Thus, for instance, there has been proposed a slowly rotating drum which is slightly inclined in the direction of discharge. Such drums are used in the viscose fiber industry for transporting the alkali cellulose during aging. The alkali cellulose is permitted to continuously enter one end of the drum and owing to the revolving inclined drum, is conveyed to the other end. For xanthatizing, carbon disulphide is pressed into the interior of the drum by means of a tube provided with holes. Owing to the continuous restacking or rearrangement of the alkali cellulose during rotation, such is admixed with the carbon disulphide, forming a xanthate.

However, this apparatus has a series of drawbacks, rendering it unsuitable for the continuous xanthating in actual practice, namely:

(1) Since the drum, at most, can only be filled two-thirds with alkali cellulose, the volume of the drum is very large.

(2) A large amount of excess air exists in the drum which renders the action of the carbon disulphide with the alkali cellulose more difficult.

(3) It is not possible to maintain an exact residence or detention time. It happens that portions of the contents are retained and xanthatized longer.

(4) The layer thickness of the reaction mass is so large that uniform removal of the heat of reaction is not possible. The temperature at the interior of the mixture is greater than at the drum wall, so that xanthatizing takes place quicker at the interior.

Another apparatus which has been proposed for continuous xanthating consists of a tower in which there is arranged in superimposed fashion a row or series of metal sheets. A vertical, slowly rotating shaft is provided with arms which wipe across the individual metal sheets. The alkali cellulose falls through a funnel onto the uppermost metal sheet of the tower. Due to agitation, the mass on the metal sheet is distributed and continuously conveyed through an opening onto the metal sheet at the next level. This process is repeated until the product leaves the tower through a discharge device at the base of the tower. Carbon disulphide gas enters through the base of the tower and ascends. The formation of the xanthate takes place upon passage through the alkali cellulose layer.

Also, this apparatus requires a large reaction surface because the alkali cellulose is constantly being loosened up due to its movement or transport. This has to be so because the carbon disulphide is not conducted along predetermined paths and uniformly through the alkali cellulose, rather seeks a path through the looser layers. An exact through flow is not provided.

Since particles which are not engaged by the agitating arms remain upon the metal sheets, an excessive xanthating occurs at such, resulting in a sticky xanthate. A tacky layer is especially formed at the lower most metal sheets which retains more and more crumbly or friable xanthate.

Therefore, another very important object of this invention relates to an improved process for continuously xanthating alkali cellulose in a manner which overcomes the previously explained drawbacks of prior art processes.

Further significant objects of the present invention are directed to the provision of an improved process for continuously xanthatizing alkali cellulose which enables (1) carrying out such continuous processing operation in a relatively small area, thereby resulting in economy of and simplication of the processing installation; (2) exact maintenance of the reaction temperature; (3) greater penetration speed of the carbon disulphide into the alkali cellulose; (4) increased production capacity; (5) uniform xanthatizing; and, (6) manufacture of a high quality and economical viscose.

Surprisingly, it has now been found that to achieve a continuous xanthatizing of alkali cellulose, it is not necessary to have large volumes of loose alkali cellulose, which is continuously moved, subjected to the action of carbon disulphide for a longer period of time.

The process according to the present invention is characterized by the features that xanthating is initiated by intensively kneading in of carbon disulphide into porous alkali cellulose, and the subsequent or after-reaction takes place without any considerable mixing of the mass.

In this respect, the carbon disulphide can be utilized in liquid or gaseous form. The alkali cellulose-carbon disulphide mixture forms in the shortest time without further mixing, a perfectly soluble xanthate.

This was certainly not to be expected according to the previous knowledge of xanthating processes. It was always assumed that the gaseous carbon disulphide only slowly penetrated the alkali cellulose flakes. More precisely, the presence of a certain gas volume was considered necessary. This assumption was also carried over to the continuous mode of operation, with the result that voluminous equipment was built in which the carbon disulphide acted in uncontrolled manner upon the alkali cellulose.

Owing to the kneading in of the carbon disulphide into the alkali cellulose while compacting the mass, it was now possible, for the first time, to initiate and complete the xanthating process in a small volume or area. Thus, a worm kneader already frequently used in the chemical industry for continuous processes can be employed for xanthating the alkali cellulose. This machine has a relatively small working or useful content, so that uncompressed alkali cellulose only results in a very small throughput per hour. The residence or detention time is so short with normal and technically feasible rotational speeds of the worm that xanthating can be carried out in the apparatus usually in thirty minutes or more. Due to the intensive kneading, the alkali cellulose in the kneader is so intimately imbued with the carbon disulphide that the reaction begins immediately. The moist lumps or "nests" which occur during discontinuous operation when admixing the carbon disulphide, cannot occur at all with the worm kneader because the infed carbon disulphide is immediately uniformly kneaded into the mass.

The alkali cellulose forms a relatively thin layer in the kneader, whereby the speed of penetration is increased. At the same time, there is thereby insured for the exact maintenance of the reaction temperature.

Owing to the compacting of the alkali cellulose imbued with carbon disulphide, which increases more and more towards the output side of the kneader, occurrence of xanthatizing is accelerated. Already after a few minutes the product is uniformly and intensively dyed. When the alkali cellulose, which is not yet completely xanthatized, leaves the kneader, the carbon disulphide is in such intimate contact with the alkali cellulose that, by merely allowing the reaction mixture to stand, xanthating is completed in ten to twenty minutes, depending upon the reaction temperature. The xanthate assumes the characteristic orange color. However, also in a shorter time, and with still a yellow color, the reaction is so uniformly advanced that the xanthate can be dissolved into a fiber-free viscose.

With continuous operation, the after-reaction of the mass leaving the kneader can be carried out in an intermediate vessel or the connecting conduit to the subsequent, likewise continuously operating dissolving apparatus. The dimensions of the intermediate vessel or the conduit are selected such that, depending upon the reaction temperature, there is provided the desired residence time. In this respect, the discharge temperature from the kneader is regulated such that it corresponds to the after-reaction temperature.

The intermediate vessel and/or the connecting conduit can consist of a pipe provided with heatable double jacket, or there can be selected a pipe having a feed worm means. In this regard, the feed worm need not bring about further mixing of the xanthate.

Different types of worm machines can be employed for the kneading in of the carbon disulphide into the alkali cellulose, for instance, single spindle machines, double worm machines, or single spindle worms with a shaft reciprocating or moving to and fro in its longitudinal direction. The main requirement placed upon these machines is only that they afford uniform and intensive kneading of the reaction components.

The present invention will be better understood and other objects, advantages and features thereof more readily appreciated by now referring to the drawing, wherein the single figure depicts a preferred embodiment of apparatus for the continuous production of viscose from alkali cellulose.

Turning attention now to the drawing, it is to be understood that only enough of the physical structure of the therein depicted apparatus for the continuous production of viscose from alkali cellulose (AC) has been shown to enable one skilled in the art to readily understand the underlying concepts of the invention. The exemplary embodiment of apparatus incorporates a conventional dosing mechanism 1 having a scale or balance 1a, a worm kneader means 2, a column 3 for carrying out the subsequent or after reaction, a dissolving device 4 provided with agitator or stirrer and a subsequently arranged pump 4a, and an homogenizer 5.

For the worm kneader means 2 there is preferably employed a so-called "Buss-Ko-Kneter" (Buss-Ko-Kneader). Such a worm kneader has been described, for instance, in the publication "Kunststoffe" 40, page 185 (1950) and in "Ullmann's Encyklopädie der Technischen Chemie," first vol. 1951, page 727. This kneader 2 carries at the worm roll an uninterrupted worm which forms individual vanes or blades. Numerous exchangeable kneading teeth are affixed at the housing wall of the kneader 2. Upon the rotational movement of the worm there is superimposed a reciprocating motion in the direction of the axis of the worm which is controlled by a suitable drive.

The aforementioned teeth bring about a better kneading of the mass by providing resistance to the mass while the worm operates, and further, tear or seize the mass back and forth in the passages between the blades of the worm. On the whole, the mass is conveyed towards the end of the worm due to the action of the rotating and reciprocating worm.

Advantageously, the introduction of the alkali cellulose takes place at the beginning of the worm and the introduction of liquid carbon disulphide at a number of locations along the housing wall and/or out of the worm for the purpose of uniformly distributing the carbon disulphide onto the alkali cellulose. It has also been found to be advantageous to employ as the starting material an air or gas-containing sodium cellulose having a density of 0.15 to 0.25 kilograms per liter.

The column 3 for the subsequent or after reaction is not exactly cylindrical, rather in the main is constructed as a downwardly widening pipe or tube. As a result, undesired arching of the mass, which could lead to clogging of the column, is prevented. At the lower region of this column 3 there is located a non-illustrated removal mechanism, a shaking device, for instance. For the sake of completeness, the dissolving device 4 and the homogenizer device 5 have been depicted, yet they have no significance insofar as the hereindescribed and claimed xanthating process is concerned.

There will now be considered two working examples for the described apparatus and which should further clarify the teachings of the invention.

EXAMPLE I

This example relates to a trial carried out in a pilot plant with average output. The porous, aerated or air-containing alkali cellulose (AC) continuously introduced via the infeed funnel 6 is dosed out in the dosing device 1 in such a manner that the receiving funnel 7 is continuously charged with 300 kilograms of alkali cellulose per hour. This alkali cellulose has a density of about 0.2 kilogram per liter.

The employed kneader 2 is operated at a rotational speed of 30 revolutions of the worm per minute. A quantity of 27 liters carbon disulphide ($CS_2$) per hour is sprayed in a continuous stream through the infeed tube 8 of the kneader 2. The quantity of carbon disulphide is generally selected such that about 10 percent excess or more is available beyond the amount theoretically required for xanthating the alkali cellulose.

During passage through the kneader 2, which requires about 4 minutes, both components are intimately admixed. As a result, the density of the mass at the output side of the kneader 2 increases to about 1 kilogram per liter due to the admixing and kneading. Xanthatizing begins immediately after contact of the carbon disulphide with the alkali cellulose within the kneader 2. The alkali cellulose introduced into the kneader 2 at room temperature of about 20° C. is heated up to about 30° C. at the output of the kneader owing to the heat of reaction and friction heat.

The reaction mixture leaving the kneader 2, and which is not yet completely converted, arrives via the free-fall conduit 9 at the column 3. The latter is preferably maintained by heating at a slightly increased temperature, i.e., about 30° C., so that the mass coming from the kneader 2 does not cool down considerably. The xanthating in the column 3 takes place during continuous, linear downward movement of the mass with the aid of a non-illustrated transport mechanism. The reaction is completed after about 10 minutes, which can be recognized by the bright orange color of the reaction mass (xanthate) effluxing from the lower end of the column.

The xanthate moves out of the column 3 in a continuous stream and through the drop tube 10 into the dissolving device 4. Here, the xanthate is admixed and dissolved with the solvent, generally indicated by reference character L, and introduced through the conduit 11, while continuously stirring or agitating. This solvent L may be lye or water.

From the dissolving device 4, the dissolved cellulose xanthate, the viscose, arrives via the pump 4a and the conduit 12 at the homogenizer 5 in which the viscose is homogenized to a spinnable solution. The homogenized viscose V departs from the homogenizer 5 through the agency of the discharge conduit 13, by means of which it can be delivered to the direct processing station or to a non-illustrated storage and aging compartment. The thus obtained viscose is completely free of fibers and can be readily spun.

EXAMPLE II

This example relates to a trial on a production basis with about a ten-fold increased output over that of Example I. In this case, there was employed a corresponding, yet larger apparatus than in Example I, which otherwise corresponds exactly to the drawing. The through put, based upon alkali cellulose (AC), amounted to about 3,000 kilograms per hour. There was used a slightly heated worm kneader 2 with a mean or average temperature of about 35° C. prevailing in the kneader.

With a number of tests carried out under approximately similar conditions, the result from test to test was an exceptionally uniform quality of the produced viscose.

By means of the depicted apparatus, it is also possible to produce viscose of higher viscosity for special fibers, by varying the quantity of carbon disulphide and the solvent.

The operating temperature in the kneader 2 and in the vessel or column 3 in which the subsequent or after reaction occurs, can be raised almost to the boiling temperature of the carbon disulphide, that is, 42° C. with normal pressure. When working with increased pressure, then this temperature increases correspondingly.

It is advantageous to carry out the reaction in the kneader under the exclusion of oxygen or air in order to prevent any danger of explosion. For this purpose, the alkali cellulose introduced by the infeed funnel 7 can be saturated with an inert gas, by the introduction of an inert gas such as nitrogen, for instance, while displacing the air contained in the mass by such inert gas. This technique is particularly then advantageous if xanthating is carried out under increased pressure.

Depending upon the trial conditions, the residence or detention time in the kneader can be regulated to a value in the range of about 3 to 20 minutes, when carrying out the reaction under normal pressure of about 1 atmosphere. It is, however, remarked that with fixed trial conditions, the divergence of the residence time in the kneader can be kept extremely short when the xanthating is regulated to the same degree.

It should be apparent from the foregoing detailed description, that the objects set forth at the outset to the specification have geen successfully achieved.

What is claimed is:

1. In a continuous process of xanthating alkali cellulose, the improvement which comprises intensively kneading carbon disulphide into non-liquid porous alkali cellulose starting with a temperature of at least about 20° C. up to the boiling point of the carbon disulphide, using carbon disulphide in excess of the amount theoretically required for xanthating the alkali cellulose, and continuously moving the reaction mixture from an input position to an output position during kneading.

2. A process as defined in claim 1, using carbon disulphide in at least 10 percent excess of the amount theoretically required for xanthating the alkali cellulose.

3. A process as defined in claim 1, wherein a porous sodium cellulose having a volume density of about 0.15 to 0.25 kilograms per liter is used as a starting material.

4. A process as defined in claim 1, including the step of saturating the alkali cellulose with an inert gas prior to kneading in the carbon disulphide.

5. A continuous process of xanthating alkali cellulose by intensively kneading carbon disulphide into non-liquid porous alkali cellulose starting with a temperature of at least 20° C. and ending with a temperature in the range from about 30° C. up to the boiling point of the carbon disulphide, using carbon disulphide in excess of the amount theoretically required for xanthating the alkali cellulose and continuously moving the reaction mixture from an input position to an output position during kneading.

6. A continuous process of xanthating alkali cellulose, comprising a first step of intensively kneading carbon disulphide into non-liquid porous alkali cellulose starting with a temperature of at least 20° C. and ending with a temperature in the range from about 30° C. up to the boiling point of the carbon disulphide, using carbon disulphide in excess of the amount theoretically required for xanthating the alkali cellulose and continuously moving the reaction mixture from an input position to an output position during kneading, the first step being extended over a time interval insufficient for the complete xanthating of the alkali cellulose, and a second step of completing the xanthating of the alkali cellulose without further kneading the reaction mixture from said first step.

7. A continuous process as defined in claim 6, wherein the first step comprises a time interval of about 3 to 20 minutes.

References Cited

UNITED STATES PATENTS

| | | | |
|---|---|---|---|
| 2,355,650 | 8/1944 | Hollihan | 260—217 |
| 2,122,519 | 7/1938 | Dokkum | 260—217 |
| 2,985,647 | 5/1961 | Kohorn | 260—217 |

FOREIGN PATENTS 711,040    6/1954    Great Britain.

DONALD E. CZAJA, *Primary Examiner.*

R. W. MULCAHY, *Assistant Examiner.*

U.S. Cl. X.R.

106—164; 260—217